United States Patent
King et al.

(10) Patent No.: US 6,889,435 B1
(45) Date of Patent: May 10, 2005

(54) ATTACHMENT OF METAL COMPONENTS BY THERMAL DRILLING

(75) Inventors: Anthony W. King, Hudson, IN (US); Todd Gerardot, Fremont, IN (US)

(73) Assignee: Dana Corporation, Toledo, OH (US)

( * ) Notice: Subject to any disclaimer, the term of this patent is extended or adjusted under 35 U.S.C. 154(b) by 206 days.

(21) Appl. No.: 10/139,512

(22) Filed: May 6, 2002

(51) Int. Cl.[7] .......................... B21K 3/00; B23K 31/02
(52) U.S. Cl. .............................. 29/888.01; 29/890.141; 29/890.15; 29/890.08; 29/432.1; 29/432.2; 29/505; 228/112.1; 123/467
(58) Field of Search .............................. 29/888, 888.01, 29/890.141, 890.15, 890.08, 432.1, 432.2, 505; 228/112.1, 136, 137, 175; 123/468, 470, 467

(56) References Cited

U.S. PATENT DOCUMENTS

| | | | |
|---|---|---|---|
| 3,939,683 A | 2/1976 | van Geffen | 72/71 |
| 4,132,097 A | 1/1979 | Ames | 72/71 |
| 4,175,413 A | 11/1979 | van Geffen | 72/71 |
| 4,185,486 A | 1/1980 | van Geffen | 72/71 |
| 4,260,094 A * | 4/1981 | Stroo | 228/112.1 |
| 4,428,214 A | 1/1984 | Head et al. | 72/69 |
| 4,454,741 A | 6/1984 | Hoogenboom | 72/71 |
| 4,887,853 A * | 12/1989 | Flowers et al. | 29/523 |
| 5,573,519 A * | 11/1996 | Zohmann | 604/272 |
| 5,984,138 A | 11/1999 | Olson | 220/801 |
| 6,470,859 B2 * | 10/2002 | Imura et al. | 123/467 |

FOREIGN PATENT DOCUMENTS

DE         4224131 A1 *  1/1994

* cited by examiner

Primary Examiner—Marc Jimenez
(74) Attorney, Agent, or Firm—Reising, Ethington, Barnes, Kisselle, P.C.

(57) ABSTRACT

A method of securing a metal component to a body having a metal wall includes placing the component against the body such that a wall of the component is in external surface contact with the wall of the body. An opening is then thermal drilled through the abutting walls causing thermal flow of material on opposite sides of the abutting walls that, when hardened, joins the component to the body.

5 Claims, 2 Drawing Sheets

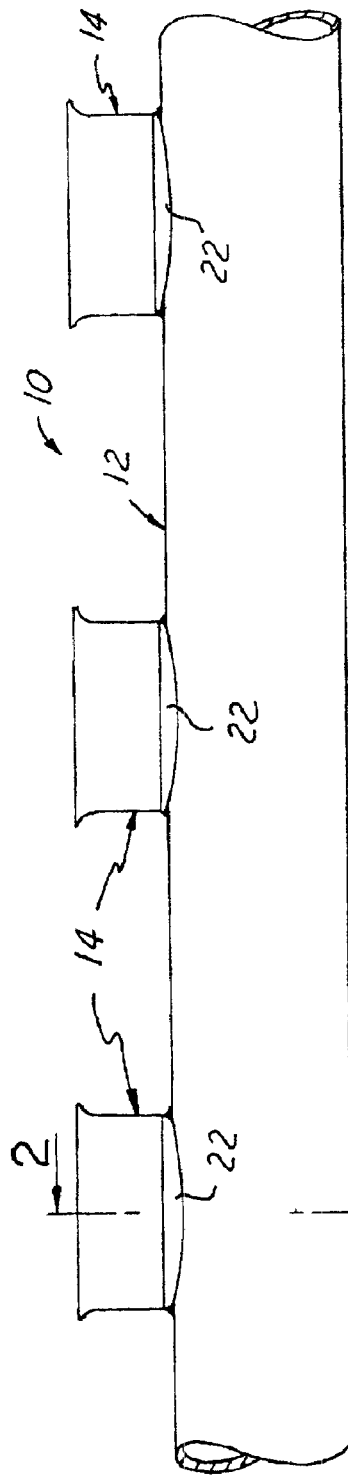
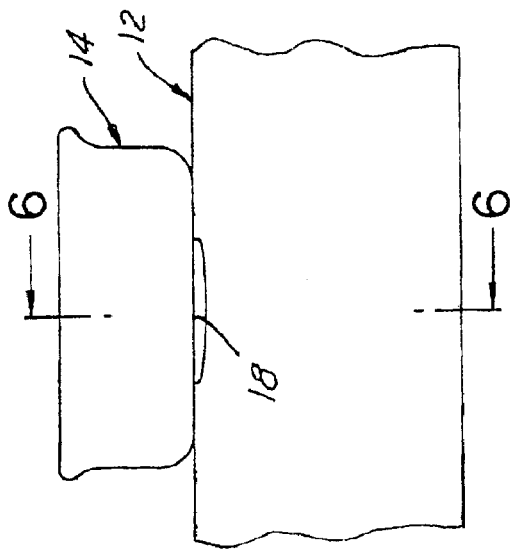
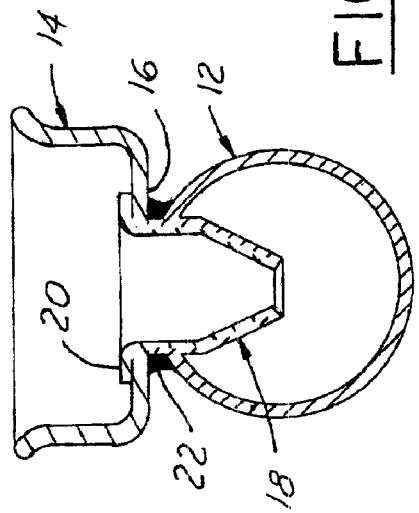

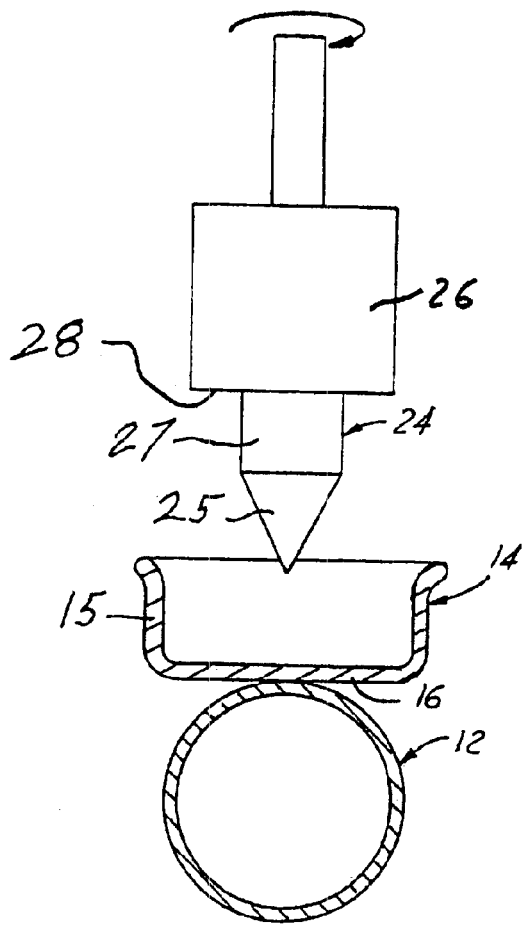
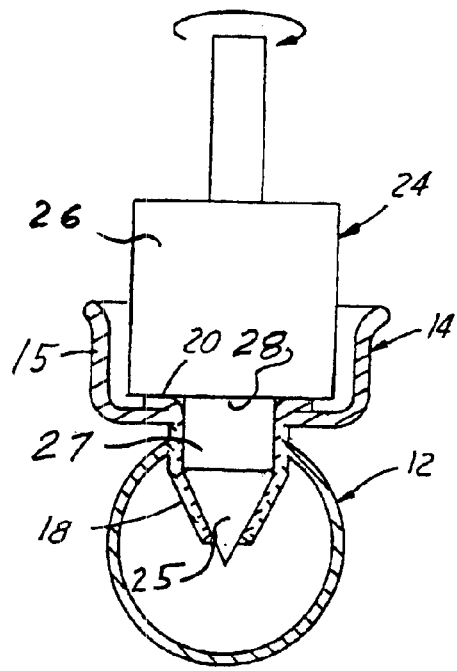
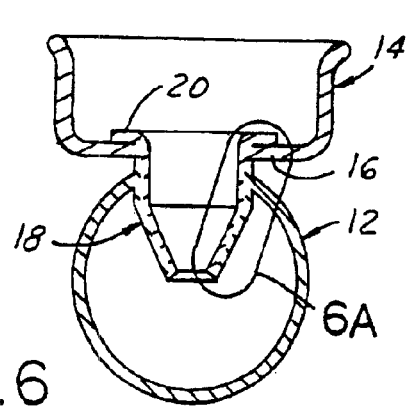
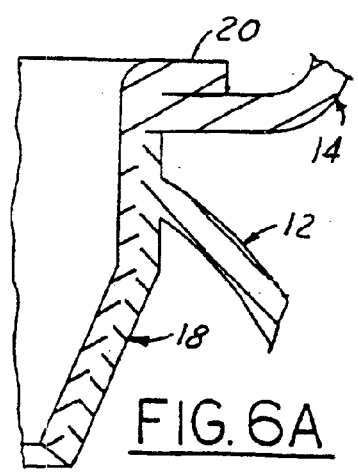
FIG. 4　　　FIG. 5
FIG. 6　　　FIG. 6A

ATTACHMENT OF METAL COMPONENTS BY THERMAL DRILLING

The present invention relates to a method of attaching metal components to each other by means of thermal drilling, and more particularly to a fuel rail and method of assembly in which component holders are externally attached to a tubular fuel rail by use of thermal drilling techniques.

BACKGROUND AND SUMMARY OF THE INVENTION

It has been proposed to form openings in metal bodies, including tubular metal bodies, by used of thermal drilling techniques, also known as flow drilling techniques. See, for example, U.S. Pat. Nos. 3,939,683, 4,132,097, 4,185,486, 4,428,214 and 4,454,741. In general, a rapidly rotating piercing tool of hard material is brought into contact with an external surface of the wall of the body. Frictional heat and pressure of the piercing tool against the body cause material to flow axially and radially forming an opening through the wall of the body. The opening is surrounded by an annular collar formed by thermal flow of material along from the tool. That is, the material that is removed to form the opening flows along the surface of the tool to form the annular collar, as distinguished from forming chips or shavings as in typical drilling operations. A general object of the present invention is to utilize thermal drilling techniques of this type to secure two metal components to each other. An illustrative, but non-limiting, exemplary embodiment of the invention employs thermal drilling techniques to join a component holder to the external surface of a tubular fuel rail for an internal combustion engine.

A method of securing a metal component to a body having a metal wall, in accordance with a first aspect of the present invention, includes placing the component against the body such that a wall of the component is in external surface contact with the wall of the body. An opening is then thermally drilled through the abutting walls of the component and the body, causing thermal flow of material on opposite sides of the abutting walls that, when hardened, joins the component to the body.

A method of securing a metal cup-shaped component holder to an external surface of a hollow tubular fuel rail for an internal combustion engine, in accordance with an exemplary embodiment of the invention, includes locating the component holder such that a base wall of the holder is in external tangential surface contact with the fuel rail, and forming an opening through the base wall and through the fuel rail where the base wall is in contact with the fuel rail, by a thermal drilling process, to secure the holder to the fuel rail by thermal flow of material into the holder and the fuel rail surrounding the opening. A fuel rail assembly in accordance with another aspect of the invention includes a hollow tubular metal fuel rail having an external surface and at least one metal component holder externally attached to the fuel rail. The component holder has a flat wall with a first portion in external tangential contact with a second portion of the external surface. The component holder is attached to the fuel rail by means of an annular collar formed by flow of metal from the wall and the tube around an opening that extends through the first and second portions.

BRIEF DESCRIPTION OF THE DRAWINGS

The invention, together with additional objects, features and advantages thereof, will be best understood from the following description, the appended claims and the accompanying drawings in which:

FIG. 1 is a fragmentary side elevational view of a fuel rail assembly in accordance with an exemplary but presently preferred implementation of the present invention;

FIG. 2 is a sectional view taken substantially along the line 2—2 of FIG. 1;

FIG. 3 is a fragmentary elevational view of a portion of the fuel rail assembly in FIG. 2 at an intermediate stage of manufacture;

FIGS. 4 and 5 are schematic illustrations of sequential stages of joining the components of the fuel rail assembly to each other by means of thermal drilling;

FIG. 6 is a sectional view that illustrates the fuel rail assembly at the stage of manufacture following the thermal drilling process, being taken substantially along the line 6—6 in FIG. 3; and FIG. 6A is a fragmentary sectional view on an enlarged scale of the portion of FIG. 6 within the area 6A.

DETAILED DESCRIPTION OF PREFERRED EMBODIMENTS

FIGS. 1–2 illustrate a fuel rail assembly 10, in accordance with an exemplary but presently preferred implementation of the invention, as comprising a tubular metal fuel rail 12 having a plurality of metal component holders 14 externally secured thereto. Fuel rail 12 is illustrated as a hollow cylindrical tubular fuel rail, although non-cylindrical geometries could be employed without departing from the scope of the invention. Component holders 14 are cup-shaped holders having a generally cylindrical side wall 15 open at its upper end and integrally joined at its lower end to a flat base wall 16 that is initially imperforate and the major dimension of which extends generally radially of the central axis of wall 15. Holders 14 may be employed, for example, for mounting fuel injectors, dampers, inlet or outlet tubes or the like to the fuel rail assembly. Holder base wall 16 is in tangential contact with the external surface of the body of tubular fuel rail 12. Holders 14 and fuel rail 12 may be of any suitable metal construction, such as low carbon steel or stainless steel. A hollow collar 18 surrounds an opening that extends through the abutting surfaces of fuel rail 12 and holder 14. Collar 18 has a flange 20 disposed within the interior of holder 14 against base wall 16 firmly holding holder 16 against the external surface of fuel rail tube 12. Thus, as clearly shown in FIGS. 2, 5, 6 and 6A, flange 20 likewise is formed such that its major dimension extends generally radially of the central axis of wall 15 so that flange 20 extends parallel to base wall 16 in snug overlapping clamping relation therewith. A ring 22 of brazing material preferably externally extends around the abutting surface portions of holder 18 and fuel rail 12 additionally securing the holder to the fuel rail.

FIGS. 4 and 5 schematically illustrate the method of attaching holder 14 to tubular fuel rail 12 in accordance with the present invention. Base wall 16 of holder 14 is brought into tangential external surface contact with fuel rail 12, and may be temporarily fixtured in this position by suitable means not shown. The abutting portions of the holder and rail are initially imperforate. A rapidly rotating piercing tool 24 is then brought into contact with base wall 16 of holder 14 in alignment with the line of surface contact between holder 14 and fuel rail 12. The speed of rotation of the tool will depend upon the manufacturer, the number of holders simultaneously assembled to the fuel rail, and other factors. In one exemplary implementation of the invention, a 6.35 mm Flowdrill Thermal Drill was used with a Bridgeport Mill operating at about 3000 rpm. Thus, as clearly shown in FIGS. 4 and 5, tool 24 has a conically shaped pointed tip portion 25 that merges smoothly at its upper end with a constant diameter cylindrical shank portion 27. Shank portion 27 terminates at its upper end at a radially extending flat abutment undersurface 28 of a diametrically enlarged follower shoulder portion 26 of tool 24. As tool 24 is advanced into holder 14, a hole is formed through the abutting walls of holder 14 and fuel rail 12 by thermal flow of material around the surface of the piercing tool. This material flows radially and axially along tool 24 into fuel rail 12 and into holder 14 where flange 20 is formed by abutment of the diametrically enlarged follower shoulder portion 26 of tool 24. As illustrated schematically in FIG. 6a, the flow material from holder 14 generally forms flange 20 by metal flow radially outwardly between abutment undersurface 28 and base wall 16 so as to cause flange 20 to radially overlap base wall 16 in clamping relation therewith. This flow of material also forms the inner portion of collar 18, and the flow material from rail 12 generally forms the outer portion of the collar, although these materials flow together so that there (preferably) is no sharp line of demarcation. The material flows weld the parts to each other. Tool 24 is then withdrawn, leaving holder 14 attached to fuel rail 12 by means of the physical structure of collar 18 after the material has hardened, which effectively welds cup-shaped holder 14 to the external surface of fuel rail tube 12. This securement of holder 14 to fuel rail tube 12 by thermal drilling preferably is enhanced by placement of a brazing ring 22 externally around the portions of the joined surfaces, and subjecting the fuel rail assembly to an otherwise conventional brazing operation.

There have thus been provided a metal component assembly, preferably a fuel rail assembly, and a method of manufacture that fully achieve all of the objects and aims previously set forth. The assembly method of the present invention eliminates any need for separately piercing or drilling the opening in the fuel rail tube, with the consequent formation of shavings or slugs that must be removed from the assembly. The method of assembly in accordance with the present invention also eliminates any need to align preformed openings in the holder and tube, such as by press fit or other alignment techniques. The method of the present invention reduces assembly cost and complexity, and improves the quality of the resulting assembly. The thermal flow weld-like joint holds the components to each other at brazing temperatures (around 2000° F.). The invention has been disclosed in conjunction with an exemplary but presently preferred implementation thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A method of securing a metal cup-shaped component holder to an external surface of a hollow tubular metal fuel rail for an internal combustion engine, and wherein said holder has a generally cylindrical side wall open at one end and joined at its axially opposite end to a radially extending initially imperforate base wall, which comprises the steps of:
   (a) locating said component holder such that the base wall of said holder is in external surface contact with said fuel rail and tangential to said external surface,
   (b) forming an opening through said base wall and said fuel rail where said base wall is in surface contact with said fuel rail by a thermal drilling process to secure said holder to said fuel rail by thermal flow of material from said wall and said rail into said holder and said fuel rail around said opening to thereby form an annular collar around said opening that extends through said contacting portions of said base wall and said rail, and
   (c) utilizing a rapidly rotating piercing tool to perform such thermal drilling of step (b), the tool having a conically shaped piercing end portion that merges at its widest diameter into a constant diameter cylindrical shank portion of the tool that in turn terminates at its end axially remote from said piercing end portion at a radially extending flat abutment undersurface of a diametrically enlarged follower shoulder portion of the tool such that the thermal flow of material into said component is formed into an annular flange radially overlapping said component base wall caused by abutment of the abutment surface of the diametrically enlarged follower shoulder portion causing metal flow radially outwardly between the abutment surface and the base wall such that the major dimension of said flange extends generally radially of the holder cylindrical side wall such that, upon hardening, said flange major dimension extends parallel to the base wall such that said flange is in snug overlapping clamping relation therewith and thereby firmly holds said component against said body wall.

2. The method set forth in claim 1, further comprising the step of: (c) brazing said holder to said fuel rail.

3. A method of securing a metal component to a body having a metal wall, which comprises:
   (a) placing said component against said body such that a wall of said component is in external surface contact with said wall of said body, and
   (b) thermal drilling an opening through said abutting walls causing thermal flow of material on opposed sides of said abutting walls and thereby forming an annular collar around said opening that extends through said abutting walls and that, when hardened, joins said component to said body, and
   (c) utilizing a rapidly rotating piercing tool to perform such thermal drilling of step (b), the tool having a conically shaped piercing end portion that merges at its widest diameter into a constant diameter cylindrical shank portion of the tool that in turn terminates at its end axially remote from said piercing end portion at a radially extending flat abutment undersurface of a diametrically enlarged follower shoulder portion of the tool such that the thermal flow of material into said component is formed into an annular external flange of said collar overlapping the component wall by abutment of the diametrically enlarged follower shoulder portion causing metal flow radially outwardly between the abutment undersurface and the component wall such that the major dimension of said flange extends generally radially of the tool shank and such that, upon hardening, said flange firmly holds said component against said body wall.

4. A method of securing a metal component to a hollow metal body, which comprises the steps of:
   (a) locating said component on said body such that a wall of said component is in external surface contact with a wall of said body,
   (b) thermal drilling an opening through said contacting walls such that said component and body are secured to each other by thermal flow of material into said component and said body, and wherein said step (b) includes forming a flange of thermal flow material within said component extending radially outwardly from said opening and along an internal surface of said component wall, and (c) thereafter externally brazing said component to said body.

5. A method of securing a metal cup-shaped component-holder to an external surface of a hollow tubular metal fuel rail for an internal combustion engine, which comprises the steps of:

(a) locating said component holder such that a base wall of said holder is in external surface contact with said fuel rail and tangential to said external surface, (b) forming an opening through said base wall and said fuel rail where said base wall is in surface contact with said fuel rail by a thermal drilling process to secure said holder to said fuel rail by thermal flow of material into said holder and said fuel rail around said opening, (c) utilizing a rapidly rotating piercing tool to perform such thermal drilling of step (b), the tool having a piercing end and a diametrically enlarged follower shoulder portion such that the thermal flow of material into said component is formed into an annular flange overlapping said component wall by abutment of the diametrically enlarged follower shoulder portion such that, upon hardening, said flange firmly holds said component against said body wall, and (d) brazing said holder to said fuel rail.

* * * * *